Patented Mar. 10, 1942

2,275,447

UNITED STATES PATENT OFFICE 2,275,447

PRODUCTION OF VALUABLE ADDITION AGENTS FOR LUBRICATING OILS

Eugene Lieber, Linden, and Louis A. Mikeska, Westfield, N. J., assignors to Standard Oil Development Company, a corporation of Delaware No Drawing. Application February 12, 1938, Serial No. 190,224

14 Claims. (Cl. 252—57)

The present invention relates to the art of producing valuable addition agents for lubricating oils and improving known agents which are to be added to lubricating oils and similar materials. The improvement will be understood from the following description.

Valuable addition agents for lubricating oils are produced by the condensation of waxy hydrocarbons, for example halogenated waxes or waxy olefins of the type derived from halogenated waxes, on aromatic or other cyclic hydrocarbons. The condensation is effected at temperatures from say room temperature up to about 300° F., more or less, and in the presence of aluminum chloride or other active metal halide catalysts of the so-called Friedel Crafts type. These condensation products if produced at relatively low temperatures and from halogenated waxes containing from 10 to 14% chlorine, the proportion by weight of the aromatic being from about $\frac{1}{5}$ to $\frac{1}{10}$ that of the halogenated wax, are endowed with excellent pour reducing properties when added to lubricating oils in relatively small proportions from up to 1 or 2%. Similar condensation products in which the pour depressing action is less marked can also be produced at higher temperatures and by increasing or decreasing the proportion of the aromatic from the preferred range. In either case these condensation products are valuable addition agents to lubricating oils when added in relatively larger amounts than are ordinarily used for pour inhibiting purposes. For example, in concentrations of from 3 to 10% or even 20%, these materials have the power of increasing the viscosity temperature coefficient or viscosity index, as this relation is better known in the petroleum industry.

It has been found that the products described herein can be further improved by secondary condensation with a dicarboxylic acid halide, especially chlorides of aliphatic dicarboxylic acids. The primary condensation product is prepared as indicated before, the conditions being chosen according to whether it is desired to produce a material with marked pour inhibiting properties or whether the thickening power is considered more important. In either case, the secondary condensation, which is the essential feature of the present invention, is effected with aluminum chloride or an equivalent catalyst of the Friedel Crafts type. The amount of AlCl₃ used is preferable in the ratio of 2 moles AlCl₃ to 1 mole dicarboxylic acid halide, but less may be employed. The reaction may be carried out in the absence of a solvent or, if desired, solvent such as naphtha, carbon disulfide or non-reactive chlorinated solvents such as dichlor or other polychlor ethanes may be employed. It is advantageous to thoroughly agitate during a reaction period of from 2 to 10 hours or longer and after this reaction period the catalyst is hydrolyzed by the addition of water, aqueous or alcoholic alkali. The product may then be separated from the sludge either by extraction with a suitable solvent such as naphtha or kerosene or the sludge may be separated by sedimentation. The product may be subjected to distillation to remove solvent and lower boiling products and the desired product is recovered as a residue.

The most effective amount of the dicarboxylic acid halide differs somewhat with the different compounds, and as the purpose for example whether maximum thickening power or pour depressing potency is sought. The reactants are preferably mixed at low temperature, and with some particular halides no heating is required to initiate the reaction; however, in most instances a slight warming may be required. It is most advantageous to add the catalyst to the diluted mixture of the ingredients slowly over a period of $\frac{1}{2}$ to 2 hours and to thoroughly agitate the reaction mixture for a total reaction time of one to six hours. The catalytic material is hydrolyzed and removed, just as indicated above.

It is ordinarily preferred to carry out the two condensations separately but, if desired, the two reactions may be conducted successfully in the same equipment. For example, a mixture of halogenated wax and the aromatic may be first condensed with aluminum chloride for several hours with thorough stirring and without separating the catalyst, the requisite amount of dicarboxylic acid halide may then be added to complete the reaction, adding a further quantity of AlCl₃ if necessary. In this way a simplification of the process may be obtained.

As indicated before the amount of the dicarboxylic acid halide may vary considerably depending on whether increase in thickening power or pour depressing potency is desired, also to a less extent on the particular acid halide used. Where it is desired to increase thickening power to a maximum, it is always preferable to employ aliphatic dicarboxylic halides rather than aromatic. Furthermore, the amount is generally between .08 and .14 gr. mol of the halide to 100 gr. of the initial condensation product. As a general rule, it may be stated that the best thickening power is below 0.20 usually obtained and at about 0.10 gr. mol per 100 gr. with most aliphatic dicarboxylic halides. The actual maximum can be readily determined by a few simple tests, and the general rule should not be depended on too far because with active halides, adipyl, for example, the best result is obtained by using a greater amount.

For maximum pour depressing power, it is more difficult to give exact ranges as the different acid halides vary more widely. It is found, however, that it is usually undesirable to increase the amount of the halide much above 0.10 gr. mol/100 gr. of the condensation product as the pour depressing potency suffers. In many instances, any substantial increase over 0.10 gr. mol/100 gr. will markedly decrease potency and usually from 0.15 to .03 is preferred. Another factor to be considered is the oil in which the depressant is to be used. The recondensation with dicarboxylic halides does not always improve potency in relatively light lubricating oils of low viscosity, indeed, in some instances, the depressor potency in such oils is diminished, but at the same time, the depressor potency in heavier oils of greater viscosity is improved.

When added to lubricating oils of low viscosity index, as little as 5% produces a large increase in viscosity index. The increase in viscosity index per per cent of the addition agent decreases with increase in the viscosity index of the oil to which it is added. In other words, the addition of equal quantities of the material to oils of low and high viscosity index will produce a greater increase of viscosity index in the first instance than in the second, but even with oils having a viscosity index of 100 the increase is substantial. When employed for pour depressing purposes, the recondensation products are usually supplied in proportion of as little as .01 to 2%. Only in rare cases is more than this required.

The following examples are given to illustrate the present invention:

Example I

To 100 parts of chlorinated paraffin wax (10.5% chlorine) were added 15 parts by weight of naphthalene, and the mixture was taken up in 43½ parts kerosene (based on chlor-wax) to effect solution. Aluminum chloride was now added slowly in an amount of about 2¼ parts and the mixture was thoroughly agitated to effect the reaction. Temperature was maintained at 88° F., during a reaction period of 6 hours and finally the catalyst was hydrolyzed by the addition of aqueous alkali.

The oily products were extracted from the mixture by means of kerosene and the kerosene solution was neutralized with water and alcohol and distilled to a temperature of about 600° F. with fire and steam in order to remove the solvent and the lower boiling constituents. The residue recovered from the distillation is a pour inhibiting compound and is referred to in the following tests as the initial condensation product.

Example II

The initial condensation product made as above was further condensed with various dicarboxylic acid chlorides. In the table below the proportion of the various acid halides to the initial condensation product is given together with the increase in viscosity and viscosity index produced when 5% of each of the secondary condensation products were added to a given hydrocarbon oil.

The secondary condensation was accomplished by dissolving the initial condensation product, (100 grams) and the acid chloride in a suitable solvent (tetrachlorethane), then adding 2 molar proportions of aluminum chloride for one molar proportion of dicarboxylic acid chloride while agitating at room temperature. The addition of catalyst was made over a period of about one hour and the mixture was then warmed gently to 80° C. and agitated for thirty minutes more. In some instances, especially when oxalyl and adipyl chlorides were used, there was a sufficiently vigorous reaction at room temperature so that no heating was employed. The catalyst was then hydrolyzed just as before and the material was extracted with kerosene and distilled to 600° F. with fire and steam.

| Acid halide used | Proportion of acid halide mols per 100 grams initial condensation product. | 5% blend of product in blank oil | | |
|---|---|---|---|---|
| | | Vis. @ 100° | Vis. @ 210° | V. I. |
| None | Blank oil alone | 149 | 42.9 | 100 |
| None | Blank oil+5% initial con. product. | 183 | 45.7 | 100 |
| Oxalyl | .110 | 222 | 50 | 124 |
| Succinyl | .114 | 207 | 48.2 | 116 |
| Adipyl | .137 | 224 | 50.0 | 122 |
| Sebacyl | .100 | 239 | 51.1 | 125 |
| Phthalyl | .100 | 209 | 48.0 | 109 |

From the above and other data, it is clearly apparent that the power of thickening and increasing viscosity index is very marked, especially with the aliphatic dicarboxylic acid halide treated products. The increase in viscosity index as shown by the above tests was from 3 to 5 points in viscosity index per per cent of the addition agent.

Example III

In another series of experiments with sebacyl chloride, the proportion was varied over a relatively wide range. In the table below the amount of sebacyl halide used is given and the effect on the blending character of the condensation product is shown. It will be seen that the blending power reaches a maximum at about 1/10 mol per 100 grams of the initial condensation product.

| Proportion of sebacyl halide mols/100 gr. initial product | 5% blend in blank oil (100 V. I.) |
|---|---|
| 0.20 | 117 |
| .10 | 125 |
| .05 | 106 |

Example IV

The initial condensation product made according to Example I was condensed with adipyl chloride, about .14 mol of the latter per 100 grams of the former, and according to the procedure shown in Example II. This material was then added to a blank oil which had a viscosity of 531 seconds Saybolt at 100° F. and 55.2 seconds at 210° F., corresponding to a viscosity index of 23.8. On adding 5% of the adipylated product, viscosity at 100° F. was raised to 818 seconds Saybolt; that at 210° F. to 70.4 sec., and the V. I. was increased to 66 which amounts to about 8½ points increase per per cent of the addition agent.

Example V

The initial condensation product made according to Example I was further condensed with several acid chlorides according to the method used in Example II. Various amounts of the chloride were used, and the several products obtained were blended with a light (A) and a heavier (B) oil. The amount of the product added to these oils was .0375%. The original oils both had pour points of 30° F.

| Acid chloride used | Gr. mols acid chloride/100 gr. | Pour point .0375% added | |
|---|---|---|---|
| | | In A oil | In B oil |
| | | *Degrees* | °F. |
| None | None | +5 | +10 |
| Sebacyl | .0422 | +5 | 0 |
| Do | .0844 | −5 | 0 |
| Oxalyl | .0617 | 0 | −5 |
| Phthalyl | .080 | 0 | 0 |

The present invention is not to be limited by any theory of the chemical reactions involved in the initial or secondary condensation nor to any particular condensation product or acid halide, but only to the following claims in which it is desired to claim all novelty inherent in the invention.

We claim:

1. The process of preparing viscosity index improving addition agents for lubricating oil which comprises condensing a wax-substituted aromatic hydrocarbon with less than about 0.2 gram mol of a dicarboxylic acid halide per 100 grams of the wax-substituted aromatic hydrocarbon in the presence of not substantially more than 2 mols of a Friedel-Crafts catalyst per mol of dibasic acid halide, at a temperature not substantially above 80° C., hydrolyzing the catalyst and distilling the condensation product to obtain a distillation residue having viscosity index improving properties.

2. The process of preparing viscosity index improving addition agents for lubricating oils which comprises condensing a wax-substituted aromatic hydrocarbon with less than about .03 to .15 gram mol of an aliphatic dicarboxylic acid halide per 100 grams of the wax-substituted aromatic hydrocarbon in the presence of not substantially more than 2 mols of aluminum chloride per mol of dibasic acid halide and in the presence of a solvent, at a temperature between about room temperature and about 80° C., hydrolyzing the catalyst and distilling the condensation product to obtain a distillation residue having viscosity index improving properties.

3. The process of preparing viscosity index improving addition agents for lubricating oils which comprises condensing a wax-naphthalene condensation product having pour-depressing properties with less than about 0.10 gram mol of sebacic acid chloride per 100 grams of the wax-naphthalene initial hydrocarbon in the presence of about 2 mols of aluminum chloride per mol of sebacyl chloride and in the presence of tetrachlor ethane as solvent, at a temperature between about room temperature and about 80° C., hydrolyzing the catalyst and distilling the condensation product to obtain a distillation residue having viscosity index improving properties.

4. The process of preparing viscosity index improving addition agents for lubricating oils which comprises condensing chlorinated paraffin wax containing about 10 to 14% chlorine with an aromatic hydrocarbon, using about one-fifth to one-tenth part by weight of aromatic hydrocarbon to one part by weight of chlorinated wax in the presence of a Friedel-Crafts catalyst at a temperature between about room temperature and about 300° F., hydrolyzing the catalyst, distilling the condensation product to remove low boiling constituents and to obtain a high boiling wax-substituted aromatic hydrocarbon distillation residue having pour-depressing properties, condensing said wax-substituted aromatic hydrocarbon with less than about 0.2 gram mol of a dicarboxylic acid halide per 100 grams of the wax-substituted aromatic hydrocarbon in the presence of not substantially more than 2 mols of a Friedel-Crafts catalyst per mol of dibasic acid halide, at a temperature not substantially above 80° C., hydrolyzing the catalyst and distilling the condensation product to obtain a distillation residue having viscosity index improving properties.

5. The process of preparing viscosity index improving addition agents for lubricating oils which comprises adding about 15 parts by weight of naphthalene to about 100 parts of chlorinated paraffin wax containing about 10.5% of chlorine, adding about 43½ parts of kerosene, based on the chlorinated wax, to aid solution, adding slowly about 2¼ parts of alumium chloride, agitating the mixture thoroughly while maintaining the temperature at about 88° F. for a reaction period of about 6 hours, hydrolyzing the catalyst, extracting the oily products from the mixture by means of kerosene and subjecting the resultant kerosene solution to distillation with fire and steam to a temperature of about 600° F. to obtain a wax-substituted naphthalene condensation product, condensing an aliphatic dicarboxylic acid halide wtih said wax-substituted naphthalene in the presence of about 2 mols of aluminum chloride per mol of acid halide, and in the presence of tetrachlor ethane as solvent and using about .03 to .20 gram mol of acid halide per 100 grams of wax-substituted naphthalene, at a temperature between about room temperature and about 80° C., hydrolyzing the catalyst when the reaction is substantially complete, diluting the reaction mixture with kerosene to extract the desired oil-soluble condensation products, and distilling the resultant kerosene solution to about 600° F. with fire and steam, whereby a residue is obtained which has very substantial oil-thickening and viscosity index increasing properties.

6. The process of preparing viscosity index improving addition agents for lubricating oils which comprises condensing chlorinated paraffin wax containing about 10 to 14% chlorine with an aromatic hydrocarbon, using about one-fifth to one-tenth part by weight of aromatic hydrocarbon to one part by weight of chlorinated wax in the presence of a Friedel-Crafts catalyst at a temperature between about room temperature and about 300° F., to make a wax-substituted aromatic hydrocarbon condensation product, and then without separating the catalyst adding less than about 0.2 gram mol of a dicarboxylic acid halide per 100 grams of wax-substituted aromatic hydrocarbon to effect a further condensation to produce a condensation product having viscosity index improving properties.

7. The product of claim 1.
8. The product of claim 2.
9. The product of claim 3.
10. The product of claim 4.

11. The product of claim 5.

12. A lubricant comprising a major proportion of a mineral lubricating oil having a viscosity index improving amount of a product prepared by the process of claim 1.

13. A lubricant comprising a major proportion of a mineral lubricating oil having a viscosity index improving amount of a product prepared by the process of claim 3.

14. A lubricant comprising a major proportion of a mineral lubricating oil having a viscosity index improving amount of a product prepared by the process of claim 4.

EUGENE LIEBER.
LOUIS A. MIKESKA.